United States Patent
Kuesel

(10) Patent No.: US 8,701,873 B2
(45) Date of Patent: Apr. 22, 2014

(54) CONVEYING SYSTEM HAVING A SPARK-DETECTING DEVICE

(71) Applicant: Phoenix Conveyor Belt Systems GmbH, Bad Blankenburg (DE)

(72) Inventor: Bernd Kuesel, Hamburg (DE)

(73) Assignee: Phoenix Conveyor Belt Systems GmbH, Bad Blankenburg (DE)

( * ) Notice: Subject to any disclaimer, the term of this patent is extended or adjusted under 35 U.S.C. 154(b) by 0 days.

(21) Appl. No.: 13/915,412

(22) Filed: Jun. 11, 2013

(65) Prior Publication Data
US 2013/0277177 A1 Oct. 24, 2013

Related U.S. Application Data

(63) Continuation of application No. PCT/EP2011/068833, filed on Oct. 27, 2011.

(30) Foreign Application Priority Data

Dec. 15, 2010 (DE) .......................... 10 2010 061 242

(51) Int. Cl.
*B65G 43/02* (2006.01)
(52) U.S. Cl.
USPC ................ 198/810.01; 198/810.02; 198/811; 198/502.1
(58) Field of Classification Search
USPC .................. 198/502.1, 810.01, 810.02, 811
See application file for complete search history.

(56) References Cited

U.S. PATENT DOCUMENTS

| 3,899,071 | A | * | 8/1975 | Duffy .................... 198/810.02 |
| 4,354,595 | A | * | 10/1982 | Reynolds .................... 198/807 |
| 4,366,897 | A | * | 1/1983 | Azuma et al. .............. 198/502.4 |
| 5,061,026 | A | * | 10/1991 | Clarke et al. .................... 385/31 |
| 5,460,261 | A |   | 10/1995 | Kusel et al. |
| 6,291,991 | B1 |   | 9/2001 | Schnell |
| 6,473,668 | B2 | * | 10/2002 | Abuzeid et al. ............... 700/121 |
| 6,702,103 | B1 |   | 3/2004 | Kuesel |
| 6,781,515 | B2 |   | 8/2004 | Kuzik et al. |
| 6,831,566 | B1 |   | 12/2004 | Kuesel |
| 6,927,394 | B2 | * | 8/2005 | Parham et al. ........... 250/339.15 |
| 7,132,943 | B2 | * | 11/2006 | Nelson .......................... 340/551 |

(Continued)

FOREIGN PATENT DOCUMENTS

| CA | 2 737 910 A1 | 3/2010 |
| DE | 24 13 543 A1 | 10/1975 |

(Continued)

OTHER PUBLICATIONS

International Search Report dated Feb. 22, 2012 of international application PCT/EP2011/068833 on which this application is based.

*Primary Examiner* — Douglas Hess
(74) *Attorney, Agent, or Firm* — Walter Ottesen P.A.

(57) ABSTRACT

A conveying system includes a conveyor belt having a carrying-side cover plate for accommodating goods to be conveyed and a running-side cover plate free of goods. Each of the cover plates is made of polymer material having elastic characteristics. A drum engages the conveyor belt at one of the side cover plates whereat a spark can develop during operation of the conveying system. A device detects the spark and corresponds with an evaluation unit. The evaluation unit is configured to transmit a signal to a fire-extinguishing unit upon detection of the spark.

11 Claims, 3 Drawing Sheets

(56) References Cited

U.S. PATENT DOCUMENTS

| | | |
|---|---|---|
| 7,178,663 B2 | 2/2007 | Schnell |
| 7,259,854 B2 | 8/2007 | Schnell |
| 7,353,937 B2 * | 4/2008 | Ziegler .................... 198/810.03 |
| 7,894,934 B2 * | 2/2011 | Wallace et al. ............... 700/230 |
| 7,954,632 B2 | 6/2011 | Kropf-Eilers |
| 8,007,917 B2 * | 8/2011 | Alexander et al. ............ 428/493 |
| 8,149,989 B2 * | 4/2012 | Schnell ........................ 378/58 |
| 2003/0000808 A1 | 1/2003 | Kusel |

FOREIGN PATENT DOCUMENTS

| | | |
|---|---|---|
| DE | 31 06 568 A1 | 9/1982 |
| DE | 31 31 963 A1 | 2/1983 |
| DE | 32 19 170 A1 | 11/1983 |
| DE | 34 14 285 A1 | 10/1985 |
| DE | 35 17 314 A1 | 1/1986 |
| DE | 36 06 129 A1 | 8/1986 |
| DE | 36 12 765 A1 | 10/1987 |
| DE | 42 40 094 A1 | 6/1994 |
| DE | 44 44 264 C1 | 4/1996 |
| DE | 197 15 703 A1 | 10/1998 |
| DE | 101 29 091 A1 | 5/2002 |
| DE | 101 40 920 A1 | 5/2002 |
| DE | 10 2009 025 906 A1 | 12/2010 |
| DE | 10 2009 025 911 A1 | 12/2010 |
| EP | 0 336 385 A1 | 10/1989 |
| EP | 1 187 781 A1 | 3/2002 |
| JP | 04-158208 A | 6/1992 |
| JP | 09-210796 A | 8/1997 |
| JP | 2000-292371 A | 10/2000 |
| JP | 2002-205813 A | 7/2002 |
| JP | 2010-37096 A | 2/2010 |
| WO | WO 2008/031648 A1 | 3/2008 |
| WO | WO 2008/034483 A1 | 3/2008 |

* cited by examiner

CONVEYING SYSTEM HAVING A SPARK-DETECTING DEVICE

CROSS REFERENCE TO RELATED APPLICATIONS

This application is a continuation application of international patent application PCT/EP2011/068833, filed Oct. 27, 2011, designating the United States and claiming priority from German application 10 2010 061 242.1, filed Dec. 15, 2010, and the entire content of both applications is incorporated herein by reference.

FIELD OF THE INVENTION

The invention relates to a conveying system including a conveyor belt having at least a carrying-side cover plate and a running-side cover plate each made of a polymer material with elastic properties. The conveying system also has a driving drum, reversing drum, carrying rollers and carrying frameworks. The conveying system forms a material-conveying upper portion and a material-free lower portion.

BACKGROUND OF THE INVENTION

A conveying system of the above type is described in detail in particular in the following patent publications:
DE 36 06 129 A1; EP 1 187 781 B1; DE 36 12 765 A1; U.S. Pat. Nos. 6,831,566; 5,460,261; 7,259,854; EP 0 336 385 B1; WO 2008/034483 A1; U.S. Pat. Nos. 6,291,991; and, 7,178, 663 B2.

The carrying-side and running-side covering plates of a conveyor belt, as core component of a conveying system, normally consist of a rubber mixture containing a rubber component or a rubber component blend, a crosslinking agent or crosslinking system, comprising a crosslinking agent and an accelerator, and normally further mixture ingredients, in particular a filler and/or a processing aid and/or an aging prevention agent and/or plasticizer and/or other additives (for example, fibers, colored pigments). The rubber base in this connection is in particular:

---
natural rubber (NR)
butadiene rubber (BR)
chloroprene rubber (CR)
styrene-butadiene rubber (SBR)
nitrile rubber (NBR)
butyl rubber (IIR)
ethylene-propylene rubber (EPM)
ethylene-propylene-diene rubber (EPDM)
SBR/NR blend
SBR/BR blend
NR/BR blend

---

Of particular importance hitherto was CR, which is distinguished by a high resistance to flame, weathering and aging, in particular for conveyor belts with use in underground mining. At the present time, the SBR/NR material base is increasingly becoming exceptionally important.

As a result of the vulcanization of a rubber mixture of the aforementioned type, the conveyor belt is given the necessary elastic properties.

The conveyor belt is normally further provided with an embedded tension carrier or reinforcement. The tension carriers used in the conveyor belt longitudinal direction are cords of steel or aramid running in parallel, cords made of steel being of particular importance. The tension carrier can, however, also be a single-layer or multilayer textile structure, in particular in the form of a fabric. Of particular importance here is a polyamide-polyester fabric. In particular in conjunction with steel cord conveyor belts, for the purpose of split prevention, in addition use is made of a transverse reinforcement made of synthetic cords, for example of polyamide (PA), embedded in the carrying-side and/or operating-side covering panel (WO 2008/034483 A1).

In addition, the following components can also be embedded in the carrying-side and/or running-side covering plate: conductor loops, transponders, barcodes, a polymer matrix with detectable particles or other detectable elements mixed in. In this regard, reference is made in particular to the following patent publications: DE 44 44 264 C1; DE 197 15 703 A1; U.S. Pat. Nos. 7,954,632; and, 6,781,515.

The conveyor belt can further be provided with a built-on part, for example with an entrainer, guide part and with edge and side wall profiles. Built-on parts of this kind comprise a polymer material (elastomer, thermoplastic elastomer, thermoplastic) and, on the foot-end thereof, are adhesively bonded to the carrying-side surface of the elastic conveyor belt. Built-on parts of this kind are described in particular in the following patent publications: DE 32 19 170 A1; DE 34 14 285 A1; DE 10 2009 025 906 A1; and, DE 10 2009 025 911 A1.

Further components of a conveying system can be:
reversing rollers or reversing drums
hold-down rollers in the case of tubular conveyor belt systems
correction rollers, in particular in tubular conveyor belt systems
chutes
monitoring devices With regard to the monitoring devices, the following possibilities with comprehensive development activities are to be mentioned in particular:
In the case of monitoring the damage to the carrying-side and/or running-side covering plates, use is made of optoelectronic systems, in particular in the form of a line or area-scan camera, reference being made in particular to the following patent publications in this regard: DE 24 13 543 A1; DE 101 29 091 A1; DE 42 40 094 A1; DE 101 40 920 A1; U.S. Pat. No. 6,702,103; EP 1 187 781 B1; U.S. Pat. Nos. 6,831,566; 7,259,854; United States patent application publication 2003/0000808; and, WO 2008/031648 A1

Of increasing importance is the inspection of a conveyor belt by means of high-energy radiation, in particular x-rays. A device of this type is described in particular in the following patent publications: DE 35 17 314 A1; U.S. Pat. No. 8,149,989; JP 04158208 A (Patent Abstracts of Japan); and, JP 2000292371 A (Patent Abstracts of Japan).

In the following text, a particular system problem will now be discussed in more detail.

In particular, in underground hard-coal mining, safety has the highest priority. Because of the easy combustibility of the coal, flame prevention is one of the greatest requirements. For the transport of coal, use is made of conveyor belts which can run over many kilometers. Were a conveyor belt to catch fire, it would propagate the flames over great distances.

In order to prevent this, conveyor belts in most countries are subject to strict fire-related requirements. In addition, sprinkler installations and other precautions for preventing and extinguishing flames are used.

The greatest danger of flame initialization originates from the formation of sparks by friction between a conveyor belt and a driving drum, reversing drum, carrying rollers and deflecting rollers or deflecting drums. It is possible for the conveyor belt to be blocked by external action; however, the driving drum, driven by a motor, continues to run. Or else, a reversing or deflecting drum is blocked while the conveyor belt continues to run. As a result of the high contact pressure of the conveyor belt, specifically on the drums, which results in a high development of heat, sparks easily occur, which can trigger a fire. The danger of spark formation is provided in particular when easily ignitable materials such as coal dust are located on the belt or the drum. Complete removal of coal dust is not possible in coal mining underground.

SUMMARY OF THE INVENTION

Against the background of the aforementioned problems, the new conveying system is distinguished by the fact that the conveying system is provided with a spark-detecting device.

The advantageous configurations of the conveying system are:

- The spark-detecting device includes an infrared transmitter as infrared source and a spark-detecting diode, which is also referred to as a spark sensor diode. The spark-detecting diode used is in particular a photodiode.
- The spark-detecting device is arranged in the lower portion of the conveyor belt, specifically, preferably in the immediate region or contact region of the conveyed material discharge drum, which can be the driving drum or the reversing drum (variant I).
- The spark-detecting device is arranged in the upper portion, in particular within the material-free area of the latter. This is preferably in the immediate region or contact region of a drum, which can be the driving drum or reversing drum, but positioned still before the material discharge area (variant II).
- An arrangement principle defined by a combination of the two aforementioned variants I and II is also possible.
- The spark-detecting device corresponds with an evaluation unit which, when sparks are detected, then automatically sends out a signal to activate fire-extinguishing units.
- The spark-detecting device is used in particular in conveying systems for underground mining.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
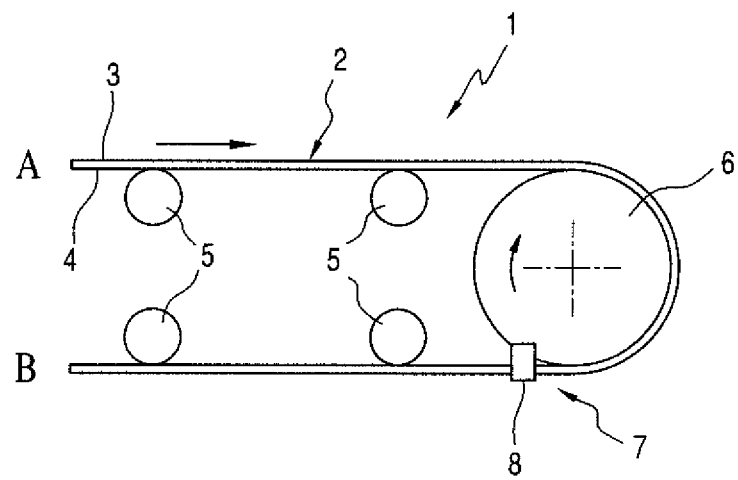
FIG. 1 shows a conveying system having a spark-detecting device in the immediate area of the driving drum within the lower portion of a conveyor belt.

FIG. 1 shows a conveying system 1 including a conveyor belt 2 comprising a carrying-side cover plate 3 for the conveyed material and a running-side cover plate 4 each made of a polymer material with elastic properties, for example of a vulcanized rubber mixture based on CR, and having embedded reinforcement or tension carriers, for example in the form of steel cords. The running-side cover plate 4 is supported on carrying rollers 5 within the upper portion A and lower portion B.

In the running direction (direction of the arrow), the conveyor belt 2 eventually reaches the material discharge drum, which here is the driving drum 6 rotating in the direction of the arrow. There, the conveyor belt 2 changes from the upper portion A to the lower portion B.

Within the lower portion B, in the immediate region of the driving drum 6, in particular in the contact region of the latter, there is arranged a spark-detecting device 7, which comprises an infrared transmitter 8.

Figure 2:
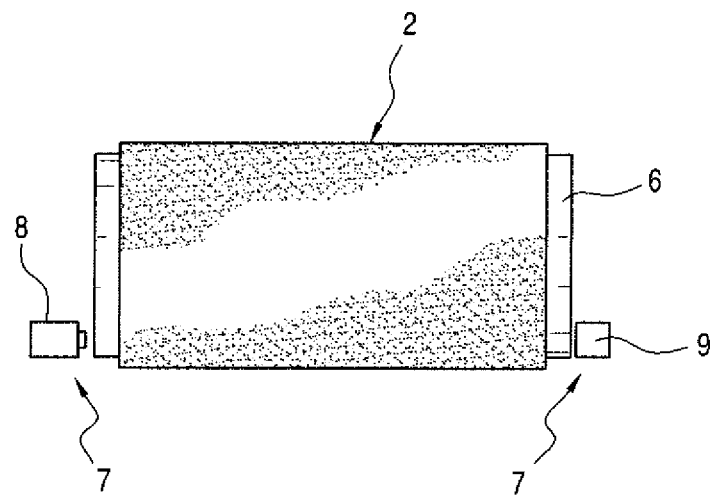
FIG. 2 shows details of the spark-detecting device according to FIG. 1, comprising an infrared transmitter and a spark-detecting diode.

FIG. 2 shows the details of this spark-detecting device 7 in the contact area of the driving drum 6, specifically comprising an infrared transmitter 8 and a spark-detecting diode 9. This device corresponds with an evaluation unit (PC, software) which, when sparks are detected, automatically sends out a signal to activate fire-extinguishing units.

Figure 3:
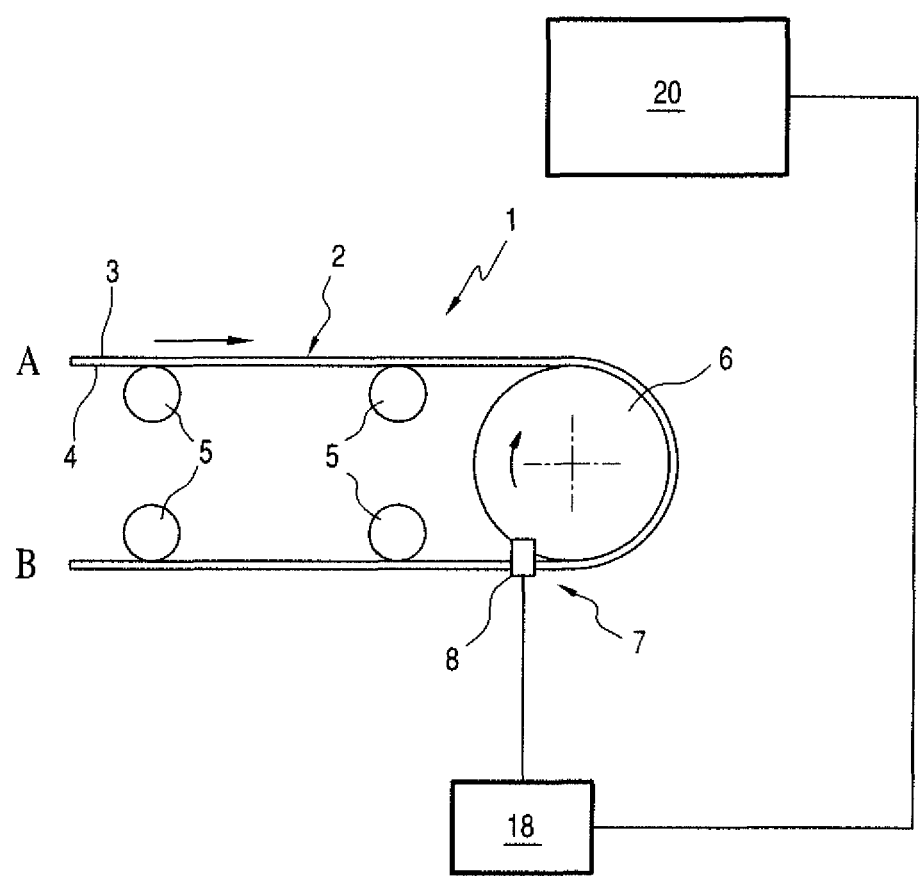
FIG. 3 shows the conveying system of FIG. 1 supplemented with an evaluation unit and a fire-extinguishing unit; and, FIG. 4 shows a conveying system having a spark-detecting device in the immediate region of the reversing drum within the upper portion of the conveyor belt.

FIG. 3 shows an evaluation unit 18 with which the spark-detecting device 7 corresponds. The evaluation unit 18 is configured to automatically transmit a signal to activate a fire-extinguishing unit 20 upon detection of a spark.

Figure 4:
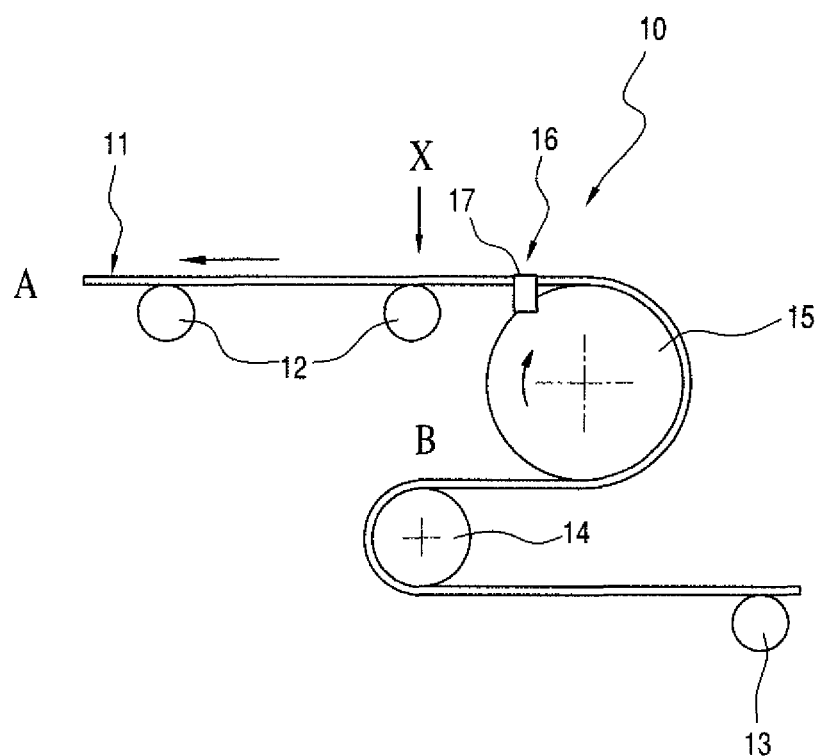

FIG. 4 shows another arrangement principle of a conveying system 10 having carrying rollers 12 and 13. In the running direction (direction of the arrow) of the conveyor belt 11, within the upper portion A between the reversing drum 15 and the material discharge area X, that is, still within the area of the upper portion A where no material is carried by the conveyor belt, there is a spark-detecting device 16. Specifically, the device 16 is in the immediate region, in particular in the contact region, of the reversing drum 15. The spark-detecting device comprises an infrared transmitter 17 and a spark-detecting diode 9 (FIG. 2). Otherwise, reference is made to that stated above for FIGS. 1 to 3.

Here, a deflection drum 14 is also arranged within the lower portion B of the conveyor belt.

It is understood that the foregoing description is that of the preferred embodiments of the invention and that various changes and modifications may be made thereto without departing from the spirit and scope of the invention as defined in the appended claims.

LIST OF DESIGNATIONS (Part of the Description)
1 Conveying system
2 Conveyor belt
3 Carrying-side cover plate
4 Running-side cover plate
5 Carrying rollers
6 Driving drum
7 Spark-detecting device
8 Infrared transmitter
9 Spark-detecting diode
10 Conveying system
11 Conveyor belt
12 Carrying rollers
13 Carrying rollers
14 Deflection drum
15 Reversing drum
16 Spark-detecting device
17 Infrared transmitter
18 Evaluation unit
20 Fire-extinguishing unit
A Upper portion B Lower portion
X Material discharge area

What is claimed is:

1. A conveying system comprising:
a conveyor belt having a carrying-side cover plate for accommodating goods to be conveyed and a running-side cover plate free of said goods;
each of said cover plates being made of polymer material having elastic characteristics;
a drum for engaging said conveyor belt at one of said side cover plates whereat a spark can develop during operation of the conveying system; and,
a device for detecting said spark.

2. The conveying system of claim 1, wherein said device includes an infrared transmitter and a diode for detecting said spark.

3. The conveying system of claim 1, wherein said conveyor belt has an upper portion ahead of said drum and a lower portion coming off of said drum as said conveyor belt moves over said drum; and, said device is mounted in the region of said lower portion of said conveyor belt.

4. The conveying system of claim 3, wherein said drum is a discharge drum for discharging said goods from said conveyor belt; said drum also is one of a driving drum for driving said conveyor belt and a reversing drum for changing the direction of movement of said conveyor belt; and, said device is mounted in the immediate vicinity of said discharge drum.

5. The conveying system of claim 1, wherein said conveyor belt has an upper portion ahead of said drum and a lower portion coming off of said drum as said conveyor belt moves over said drum; and, said device is mounted in the region of said upper portion of said conveyor belt.

6. The conveying system of claim 1, wherein said conveyor belt has an upper portion ahead of said drum and a lower portion coming off of said drum as said conveyor belt moves over said drum; said upper portion of said conveyor belt has a segment ahead of said drum whereat said upper portion is free of said goods conveyed by said conveyor belt; and, said device is mounted in the region of said segment.

7. The conveying system of claim 6, wherein said upper portion of said conveyor belt defines a location (X) whereat said goods are removed from said conveyor belt and said segment extends from said location (X) to said drum; said drum is one of a driving drum and a reversing drum; and, said device is mounted in close proximity to said drum downstream from said location (X).

8. The conveying system of claim 1, further comprising an evaluation unit; and, said device for detecting said spark being configured to correspond with said evaluation unit.

9. The conveying system of claim 8, further comprising a fire-extinguishing unit; and, said evaluation unit being configured to automatically transmit a signal to activate said fire-extinguishing unit upon detection of said spark.

10. The conveying system of claim 1, wherein said conveying system is configured for placement in a mine.

11. A conveying system comprising:
a conveyor belt having a carrying-side cover plate for accommodating goods to be conveyed and a running-side cover plate free of said goods;
each of said cover plates being made of polymer material having elastic characteristics;
a drum for engaging said conveyor belt at one of said side cover plates whereat a spark can develop during operation of the conveying system;
said drum and said one of said side cover plates conjointly defining an interface;
a spark-detecting device mounted in close proximity to said interface for detecting said spark;
a fire-extinguishing unit; and,
an evaluation unit operatively connected to said spark-detecting device and being configured to automatically transmit a signal to activate said fire-extinguishing unit upon detection of said spark.

* * * * *